(12) United States Patent
Li et al.

(10) Patent No.: US 12,074,331 B2
(45) Date of Patent: Aug. 27, 2024

(54) BATTERY CELL

(71) Applicant: NINGDE AMPEREX TECHNOLOGY LIMITED, Ningde (CN)

(72) Inventors: Jing Li, Ningde (CN); Hengtao Xia, Ningde (CN); Hongze Gao, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 137 days.

(21) Appl. No.: 17/216,300

(22) Filed: Mar. 29, 2021

(65) Prior Publication Data

US 2021/0305645 A1   Sep. 30, 2021

(30) Foreign Application Priority Data

Mar. 27, 2020   (CN) .......................... 202020424941.9

(51) Int. Cl.
  *H01M 10/0587* (2010.01)
  *H01M 50/124* (2021.01)
  *H01M 50/198* (2021.01)
  *H01M 50/46* (2021.01)

(52) U.S. Cl.
  CPC ..... *H01M 50/124* (2021.01); *H01M 10/0587* (2013.01); *H01M 50/198* (2021.01); *H01M 50/46* (2021.01)

(58) Field of Classification Search
  CPC .............. H01M 50/124; H01M 50/46; H01M 10/0587; H01M 50/198
  USPC .......................................................... 429/185
  See application file for complete search history.

(56) References Cited

U.S. PATENT DOCUMENTS

| | | | |
|---|---|---|---|
| 2012/0129014 A1* | 5/2012 | Baek ..................... | H01M 50/119 429/7 |
| 2013/0288110 A1* | 10/2013 | Schaefer ............... | H01M 50/54 429/246 |
| 2018/0175451 A1* | 6/2018 | Inoue .................... | H01M 50/116 |
| 2018/0269523 A1* | 9/2018 | Kawate ............... | H01M 50/474 |

FOREIGN PATENT DOCUMENTS

CN       208460858 U       2/2019

* cited by examiner

*Primary Examiner* — Jonathan G Jelsma
*Assistant Examiner* — Omar M Kekia
(74) *Attorney, Agent, or Firm* — Morgan, Lewis & Bockius LLP

(57) ABSTRACT

A battery cell includes an electrode assembly, a first adhesive film, and a first adhesive layer. Outer surfaces of the electrode assembly include a first surface, a first lateral surface, a second surface opposite to the first surface, and a second lateral surface opposite to the first lateral surface. The first adhesive film adheres to the first lateral surface and extends from the first lateral surface to the first surface or extends from the first lateral surface to both the first surface and the second surface. The first adhesive layer adheres to the first surface. At least a part of the first adhesive layer overlaps the first adhesive film on a side of the first adhesive film in a thickness direction perpendicular to the first surface, and in the overlap, the first adhesive film disposed between the part of the first adhesive layer and the first surface in the thickness direction.

18 Claims, 14 Drawing Sheets

BATTERY CELL

CROSS-REFERENCE TO RELATED APPLICATIONS

This application claims priority to Chinese Application No. 202020424941.9, filed on Mar. 27, 2020 and entitled "BATTERY CELL AND BATTERY THAT USES SAME", which is incorporated herein by reference in its entirety.

TECHNICAL FIELD

This application relates to the field of batteries, and in particular, to a battery cell and a battery that uses the battery cell.

BACKGROUND

With the mature application of a consumer electronic product, users are paying more attention to risks arising during use of an integrated device. For example, drop resistance requirements on the electronic product are increasingly higher. As an important part of the electronic product, a battery also needs to meet drop resistance requirements. To improve drop resistance performance of the battery, a double-sided hot-melt adhesive is affixed to an electrode assembly so that a packaging bag and the electrode assembly are connected into a whole. This avoids deformation of an electrode plate, folding of a separator, and opening of a top seal caused by an impact of the electrode assembly during dropping. However, a strong interaction occurs at a junction between a region with the double-sided hot-melt adhesive and a region without the double-sided hot-melt adhesive on the electrode assembly, and the junction is likely to be torn. After the junction is torn, the double-sided hot-melt adhesive stops working, and the drop resistance function is likely to fail subsequently. This may cause a short circuit in the battery or damage a package of the battery and leak an electrolytic solution, thereby posing a relatively high safety risk.

SUMMARY

In view of the foregoing situation, it is necessary to provide a battery cell that improves safety and reduces failure, and a battery that uses the battery cell.

An embodiment of this application provides a battery cell, including an electrode assembly. Outer surfaces of the electrode assembly include a first surface, a first lateral surface, a second surface, and a second lateral surface that are connected sequentially. The first surface is disposed opposite to the second surface, and the first lateral surface is disposed opposite to the second lateral surface. The first adhesive film adheres to the first lateral surface and extends from the first lateral surface to the first surface or extends from the first lateral surface to both the first surface and the second surface. The first adhesive layer adheres to the first surface. At least a part of the first adhesive layer overlaps the first adhesive film on a side of the first adhesive film in a thickness direction perpendicular to the first surface, the side being located away from the electrode assembly (i.e. in the overlap, the first adhesive film is disposed between the part of the first adhesive layer and the first surface in the thickness direction).

In some embodiments, in a first direction perpendicular to the first lateral surface, a width of an overlap between the first adhesive film and the first adhesive layer is greater than or equal to 1 mm.

In some embodiments, on the first surface and in a second direction perpendicular to the first direction, the first adhesive layer includes a first end and a second end opposite to the first end, and the first adhesive film protrudes from the first end and the second end of the first adhesive layer.

In some embodiments, a length by which the first adhesive film protrudes from the first end or the second end of the first adhesive layer in the second direction is greater than or equal to 1 mm.

In some embodiments, the battery cell further includes a second adhesive film, the second adhesive film adheres to the second lateral surface, and extends from the second lateral surface to the first surface, and a part of the first adhesive layer overlaps the second adhesive film on a side of the second adhesive film in the thickness direction perpendicular to the first surface, the side being located away from the electrode assembly (i.e. in the overlap, the second adhesive film is disposed between the part of the first adhesive layer and the first surface in the thickness direction).

In some embodiments, one end of the first adhesive film on the first surface extends to the second lateral surface or extends to the second surface through the second lateral surface, and the entire first adhesive layer adheres to a surface of the first adhesive film, the surface being located away from the first surface (i.e. in the overlap, the first adhesive film is disposed between the entire first adhesive layer and the first surface in the thickness direction).

In some embodiments, the first adhesive film includes a first adhesive sub-film and a second adhesive sub-film; on the first surface and in the second direction perpendicular to the first direction, the first adhesive sub-film and the second adhesive sub-film adhere to the first lateral surface by being spaced apart, and separately extend from the first lateral surface to the first surface. At least a part of the first adhesive layer overlaps the first adhesive sub-film on a surface of the first adhesive sub-film and overlaps the second adhesive sub-film on a surface of the second adhesive sub-film, wherein the surface of the first adhesive sub-film and the surface of the second adhesive sub-film are located away from the first surface (i.e. in the overlap, the first adhesive sub-film and the second adhesive sub-film are disposed between the part of the first adhesive layer and the first surface in the thickness direction, respectively).

In some embodiments, the electrode assembly includes a plurality of electrode plates and a separator located between two adjacent electrode plates, the electrode assembly is formed by winding the electrode plates and the separator, the first surface is a side in which a tail end of an outermost electrode plate in the electrode assembly is located, the first surface includes a first part and a second part that are separable, the ending is located in the first part, and the first adhesive layer extends from the first part to the second part to fix the ends.

In some embodiments, a side of the first adhesive film away from the electrode assembly is not adhesive, and the first adhesive layer is a hot-melt adhesive.

An embodiment of this application further provides a battery, including a sealing film. The battery further includes the battery cell described above. The sealing film seals the battery cell, and the first adhesive layer adheres to the sealing film.

In the battery cell and the battery that uses the battery cell according to this application, the first adhesive film overlaps at least a part of the first adhesive layer. When the battery cell or battery drops, a part of a force exerted on the first adhesive layer adhering to the sealing film is transferred to the first adhesive film, and mutual pulling between the first adhesive layer and the electrode assembly is reduced. In addition, an anti-tearing capability of the first adhesive film is higher than that of the electrode plate in the electrode assembly, thereby reducing risks of tearing the electrode plate in the battery cell or battery and improving safety performance of the battery cell or battery.

BRIEF DESCRIPTION OF DRAWINGS

FIG. 1*l* is a schematic view of a bottom of a battery cell according to an embodiment of this application;

REFERENCE NUMERALS

| | | |
|---|---|---|
| | Battery cell | 100 |
| | Electrode assembly | 10 |
| | First surface | 11 |
| | First lateral surface | 13 |
| | Second surface | 15 |
| | Second lateral surface | 17 |
| | First adhesive film | 30 |
| | First adhesive layer | 50 |
| | First direction | X |
| | Second direction | Y |
| | First end | 50a |
| | Second end | 50b |
| | First part | 111 |
| | Second part | 113 |
| | Thickness direction | Z |
| | Second adhesive film | 40 |
| | First adhesive sub-film | 301 |
| | Second adhesive sub-film | 303 |
| | First tab | 61 |
| | Second tab | 63 |
| | Battery | 200 |
| | Sealing film | 201 |

This application is further described below with reference to the following specific embodiments and the foregoing drawings.

DETAILED DESCRIPTION OF EMBODIMENTS

The following clearly describes the technical solutions in the embodiments of this application. Apparently, the described embodiments are merely a part of but not all of the embodiments of this application. Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail. To the extent that no conflict occurs, the following embodiments/implementations and the features in the embodiments/implementations may be combined with each other.

Figure 1:
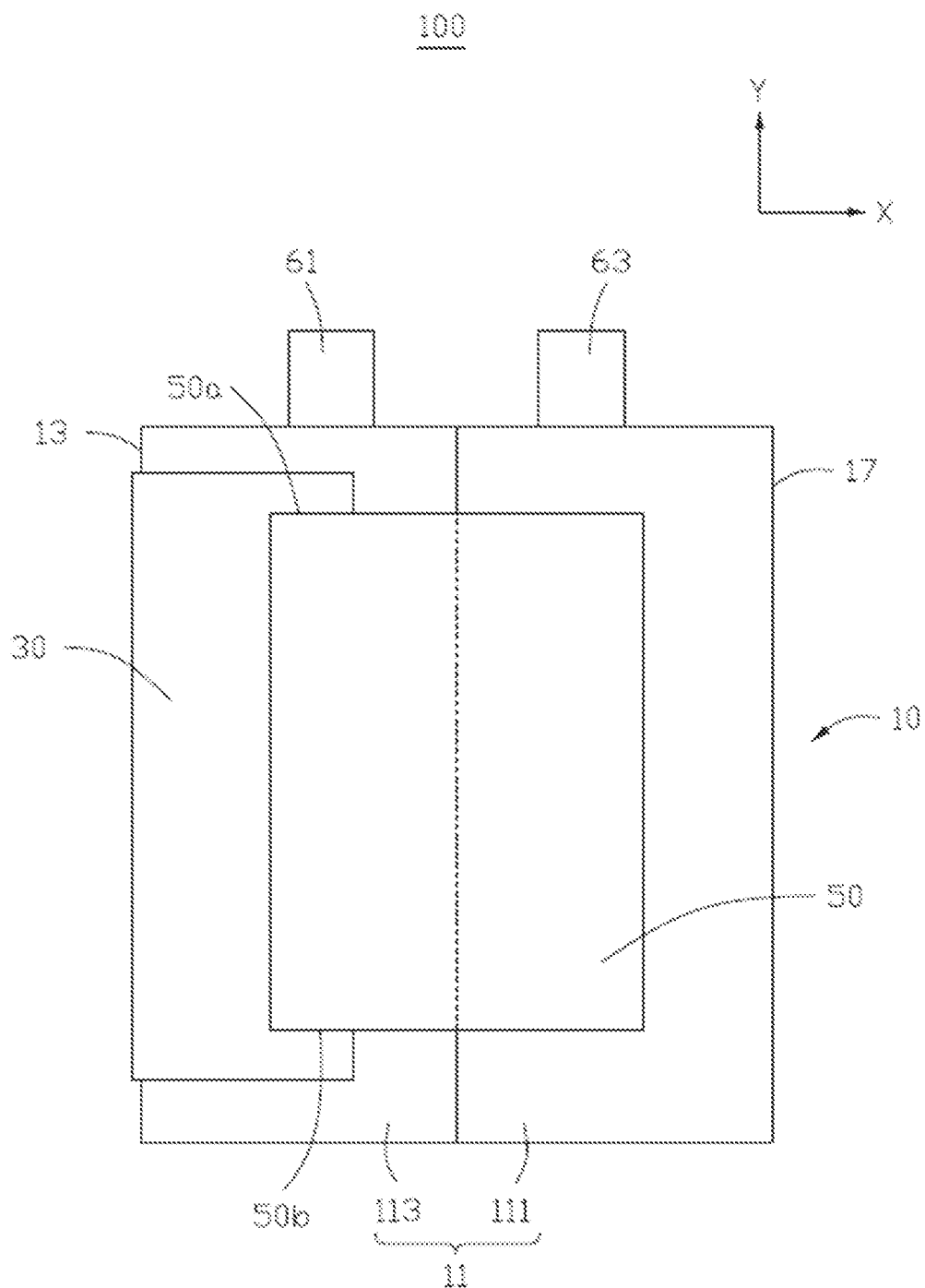
FIG. 1 is a schematic front view of a battery cell according to an embodiment of this application.
Figure 2:
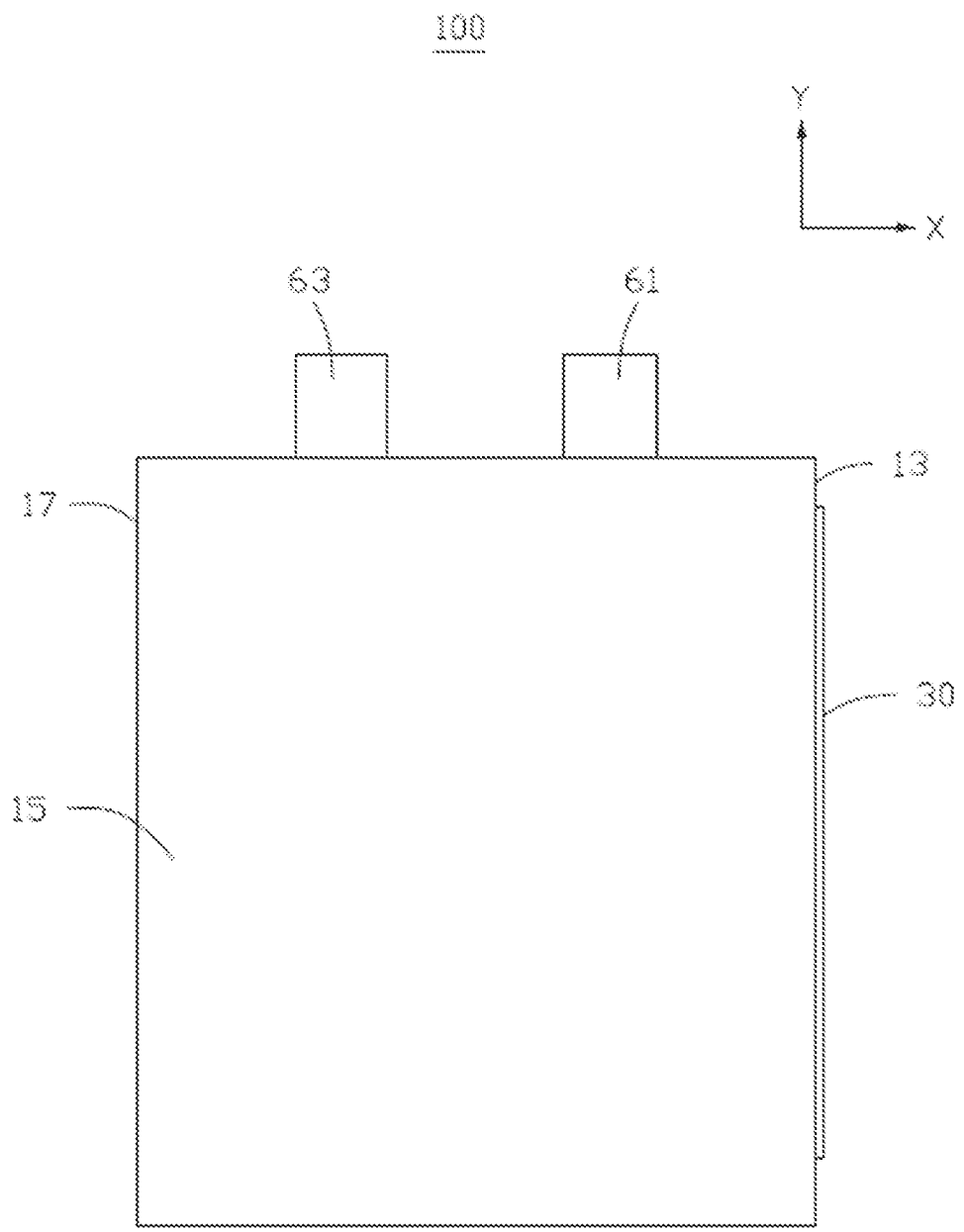
FIG. 2 is a schematic rear view of a battery cell according to an embodiment of this application.
Figure 3:
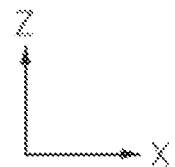
FIG. 3 is a schematic view of a bottom of a battery cell according to an embodiment of this application.
Figure 3:
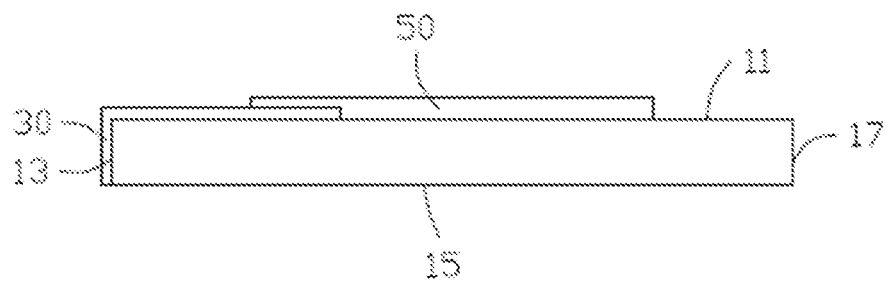

Referring to FIG. 1, FIG. 2, and FIG. 3, a battery cell 100 according to an embodiment of this application includes an electrode assembly 10, a first adhesive film 30, and a first adhesive layer 50.

Outer surfaces of the electrode assembly 10 include a first surface 11, a first lateral surface 13, a second surface 15, and a second lateral surface 17 that are connected sequentially. The first surface 11 is disposed opposite to the second surface 15, and the first lateral surface 13 is disposed opposite to the second lateral surface 17. In this embodiment, the electrode assembly 10 is formed by winding a plurality of electrode plates (not shown in the drawings) and a separator (not shown in the drawings) located between two adjacent electrode plates. The first surface 11 is a surface in which a tail end of an outermost electrode plate in the electrode assembly 10 is located.

The first adhesive film 30 adheres to the first lateral surface 13 and extends from the first lateral surface 13 to the first surface 11 along a first direction X. The first direction X is a width direction of the electrode assembly 10. A side of the first adhesive film 30, which is located away from the electrode assembly 10, is not adhesive. For example, the first adhesive film 30 may be a single-sided adhesive, including a laminated insulating substrate layer (not shown in the drawing) and a second adhesive layer (not shown in the drawing). The insulating substrate layer is not adhesive. A side of the second adhesive layer, the side being located away from the insulating substrate layer, bonds the electrode assembly 10. Further, the first adhesive film 30 may be, but is not limited to, green adhesive.

In some embodiments, along the first direction X, a width of the first adhesive film 30 extending on the first surface 11 is greater than or equal to 1 mm.

The first adhesive layer 50 adheres to the first surface 11. At least a part of the first adhesive layer 50 overlaps the first adhesive film 30 on a surface of the first adhesive film in a thickness direction Z perpendicular to the first surface 11, where the surface is on a side that is located away from the electrode assembly 10. When the battery cell 100 or battery 200 drops, a part of a force exerted on the first adhesive layer 50 adhering to the sealing film is transferred to the first adhesive film 30, and mutual pulling between the first adhesive layer 50 and the electrode assembly 10 is reduced. In addition, an anti-tearing capability of the first adhesive film 30 is higher than that of the electrode plate in the electrode assembly 10, thereby reducing risks of tearing the electrode plate in the battery cell 100 or battery 200 and improving safety performance of the battery cell or battery. In some embodiments, in the first direction X, a width of an overlap between the first adhesive film 30 and the first adhesive layer 50 is greater than or equal to 1 mm. In some embodiments, in the first direction X, the width of the overlap between the first adhesive film 30 and the first adhesive layer 50 is greater than or equal to 5 mm. A material of the first adhesive layer 50 may be, but is not limited to, a hot-melt adhesive.

A direction perpendicular to the first direction X and the thickness direction Z is defined as a second direction Y, that is, a length direction. In the second direction Y, the first adhesive layer 50 includes a first end 50a and a second end 50b that are opposite to each other. The first adhesive film 30 protrudes from both the first end 50a and the second end 50b of the first adhesive layer 50, thereby further reducing risks of tearing at the time of dropping, where the tearing occurs in positions on the first surface 11 and the positions correspond to a region close to the first lateral surface 13 at the first end 50a of the first adhesive layer 50 and a region close to the first lateral surface 13 at the second end 50b. In some embodiments, in the second direction Y, a length by which the first adhesive film 30 protrudes from the first end 50a or the second end 50b of the first adhesive layer 50 is greater than or equal to 1 mm. In some embodiments, the length by which the first adhesive film 30 protrudes from the first end 50a or the second end 50b of the first adhesive layer 50 is greater than or equal to 5 mm.

The first surface 11 includes a first part 111 and a second part 113 that are detachable. A tail end of the electrode assembly 10 is located in the first part 111. In some embodiments, as shown in FIG. 1, the first adhesive layer 50 may extend from the first part 111 to the second part 113 to fix the ending of the electrode assembly 10. In some embodiments, the second part 113 is located between the first part 111 and the first lateral surface 13. The first part 111 is more likely to move relative to the entire electrode assembly 10. Therefore, the first part 111 is less likely to be torn when the battery cell 100 drops. Therefore, the first adhesive film 30 is disposed on the side away from the first part 111 to further improve the drop resistance performance of the battery cell 100 and reduce the risks of tearing the electrode plate in the electrode assembly 10. In other embodiments, the first adhesive layer 50 may also be disposed merely on the first part 111 or the second part 113. The first part 111 may also be located between the second part 113 and the first lateral surface 13.

Figure 4:
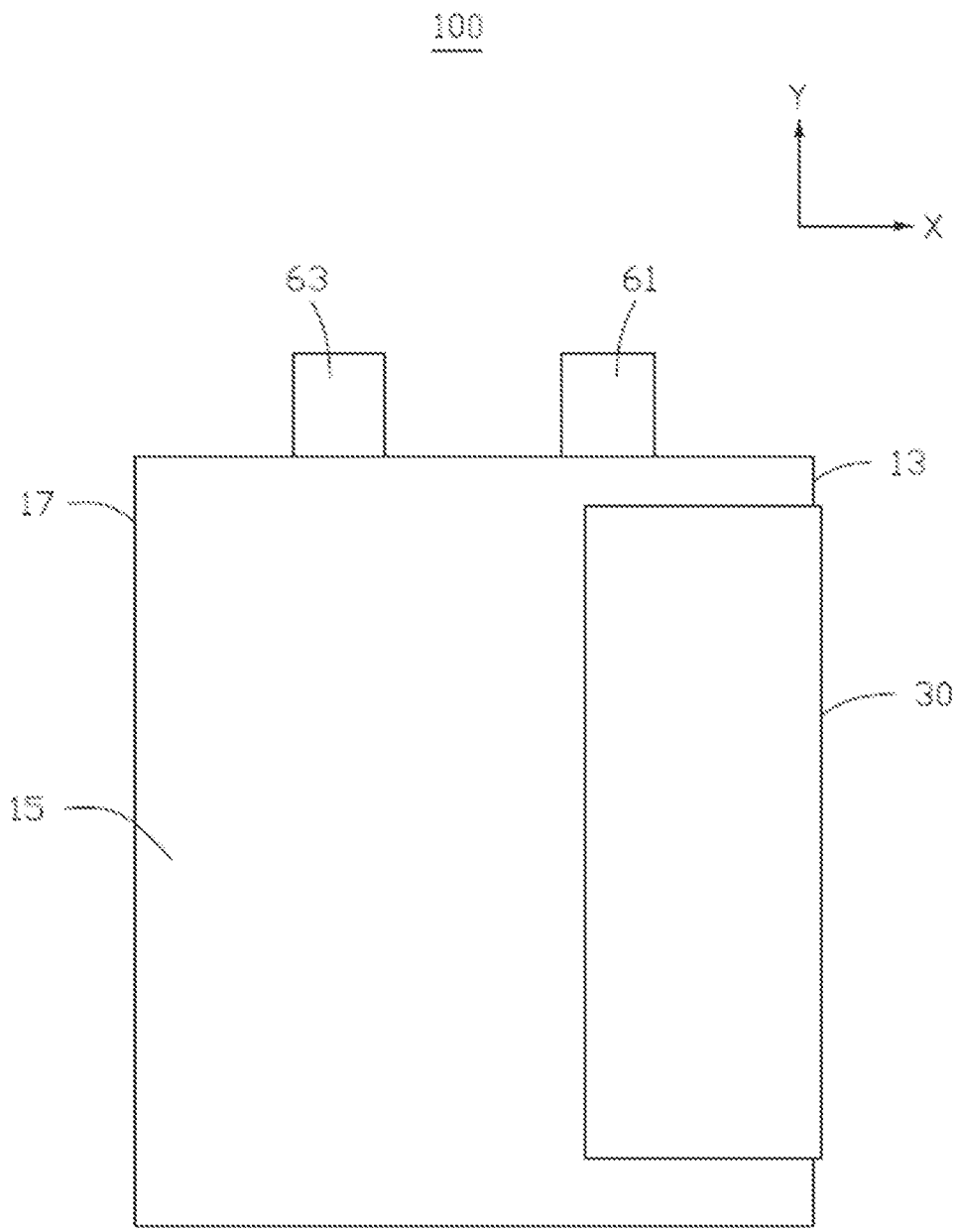
FIG. 4 is a schematic rear view of a battery cell according to an embodiment of this application.
Figure 5:
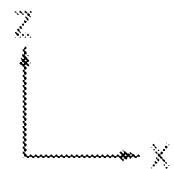
FIG. 5 is a schematic view of a bottom of a battery cell according to an embodiment of this application.
Figure 5:
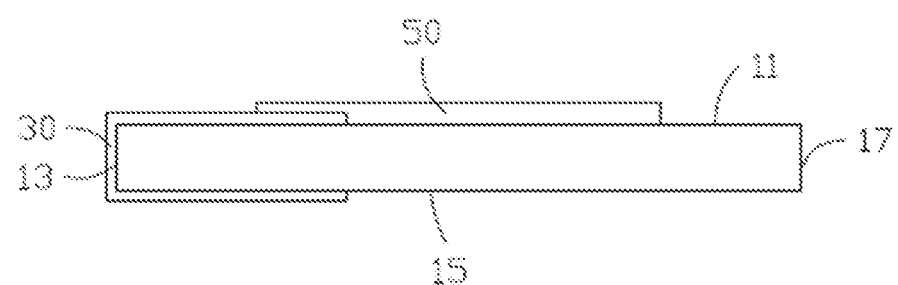

In some embodiments, referring to FIG. 4 and FIG. 5, the first adhesive film 30 may also extend from the first lateral surface 13 to the second surface 15. In some embodiments, along the first direction X, a width of the first adhesive film 30 extending on the second surface 15 is greater than or equal to 1 mm.

Figure 6:
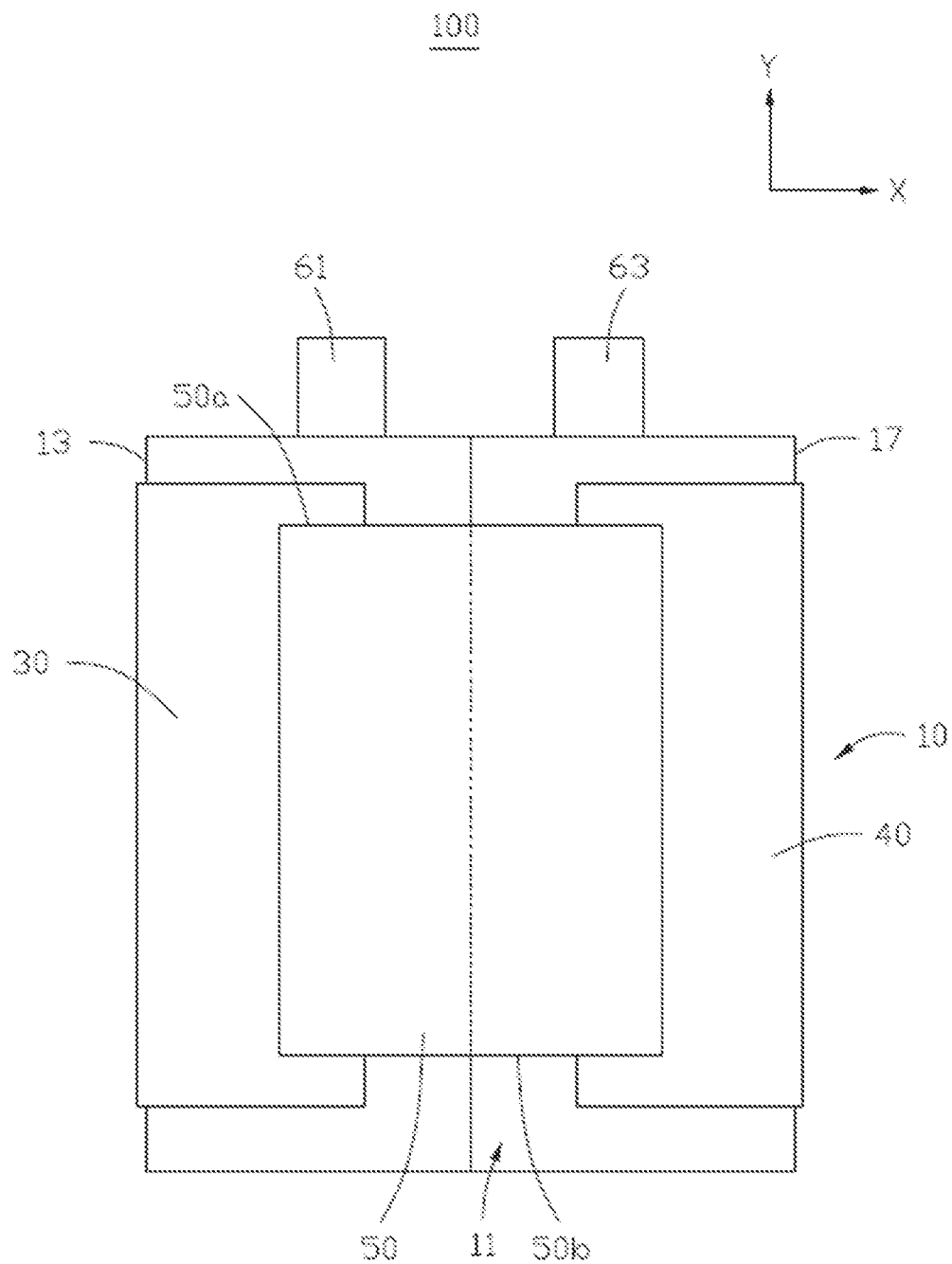
FIG. 6 is a schematic front view of a battery cell according to an embodiment of this application.
Figure 7:
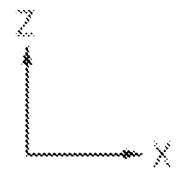
FIG. 7 is a schematic view of a bottom of a battery cell according to an embodiment of this application.
Figure 7:
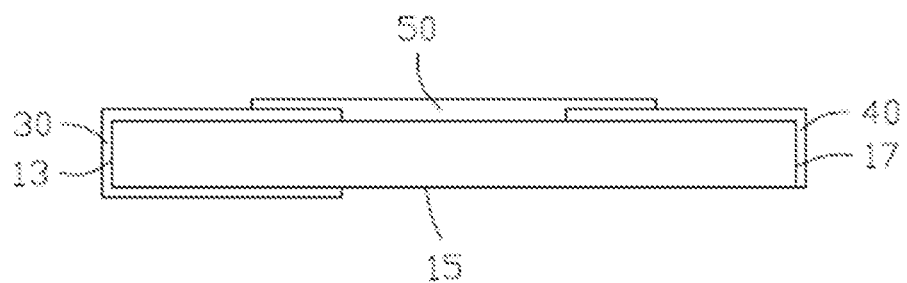

In some embodiments, referring to FIG. 6 and FIG. 7, the battery cell 100 may further include a second adhesive film 40. The second adhesive film 40 adheres to the second lateral surface 17 and extends from the second lateral surface 17 to the first surface 11. A side of the second adhesive film 40, which is located away from the electrode assembly 10, is not adhesive, and may be made of a material identical to that of the first adhesive film 30. In some embodiments, along the first direction X, a width of the second adhesive film 40 extending on the first surface 11 is greater than or equal to 1 mm.

In the thickness direction Z, a part of the first adhesive layer 50 overlaps the second adhesive film 40 on a surface of the second adhesive film, where the surface is located on a side away from the electrode assembly 10. In this way, the drop resistance performance of the battery cell 100 is further enhanced, and the safety of the battery cell 100 is further enhanced. In some embodiments, in the first direction X, a width of an overlap between the second adhesive film 40 and the first adhesive layer 50 is greater than or equal to 1 mm.

Further, the second adhesive film 40 protrudes from both the first end 50a and the second end 50b of the first adhesive layer 50. In some embodiments, in the second direction Y, a length by which the second adhesive film 40 protrudes from the first end 50a or the second end 50b of the first adhesive layer 50 is greater than or equal to 1 mm. In some embodiments, the length by which the second adhesive film 40 protrudes from the first end 50a or the second end 50b of the first adhesive layer 50 is greater than or equal to 5 mm.

Figure 8:
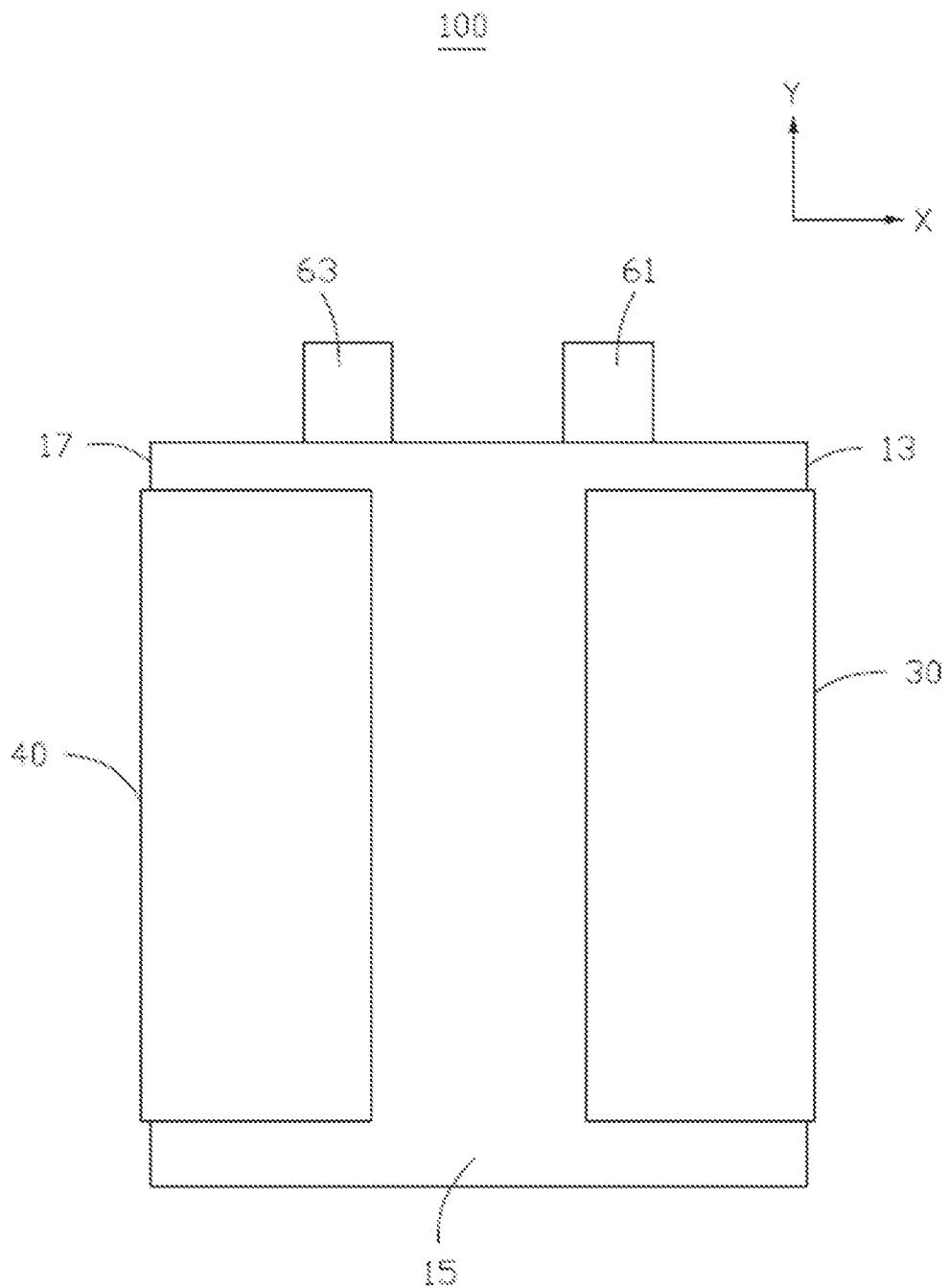
FIG. 8 is a schematic rear view of a battery cell according to an embodiment of this application.
Figure 9:
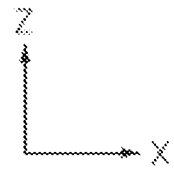
FIG. 9 is a schematic view of a bottom of a battery cell according to an embodiment of this application.
Figure 9:
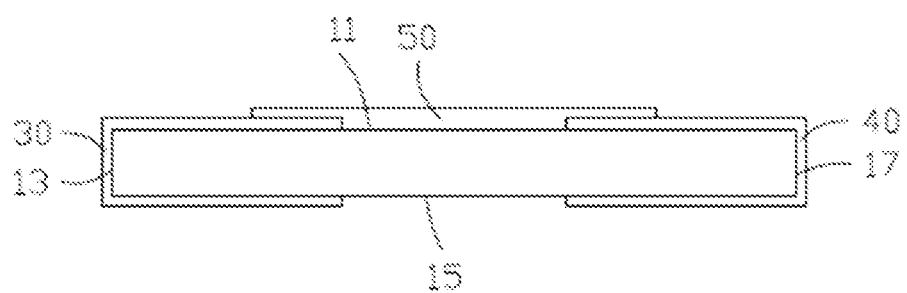

In some embodiments, referring to FIG. 8 and FIG. 9, the second adhesive film 40 may also extend from the second lateral surface 17 to the second surface 15. In some embodiments, along the first direction X, a width of the second adhesive film 40 extending on the second surface 15 is greater than or equal to 1 mm.

Figure 10:
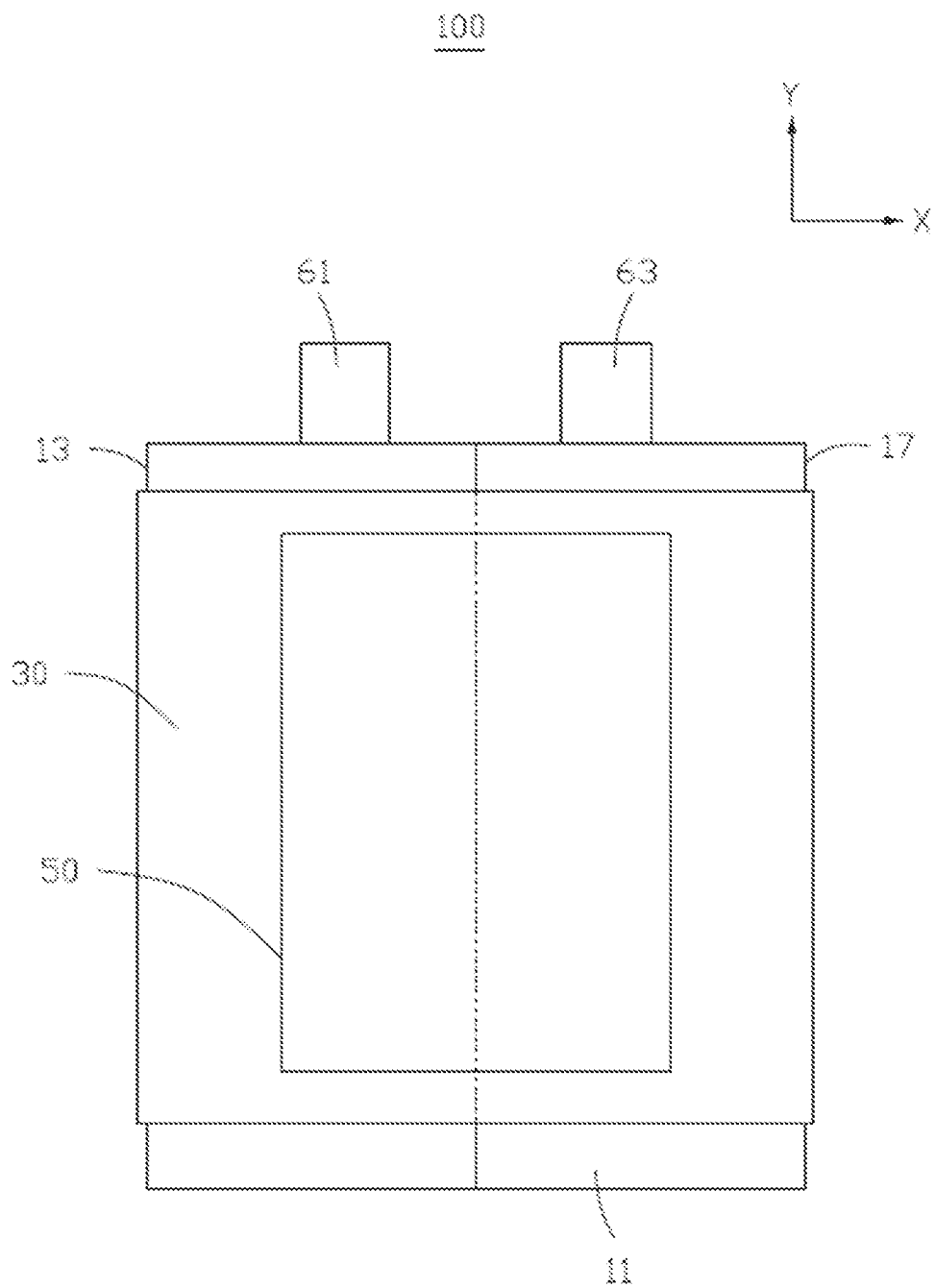
FIG. 10 is a schematic front view of a battery cell according to an embodiment of this application.
Figure 11:
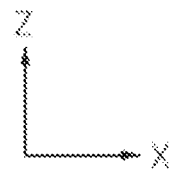
Figure 11:
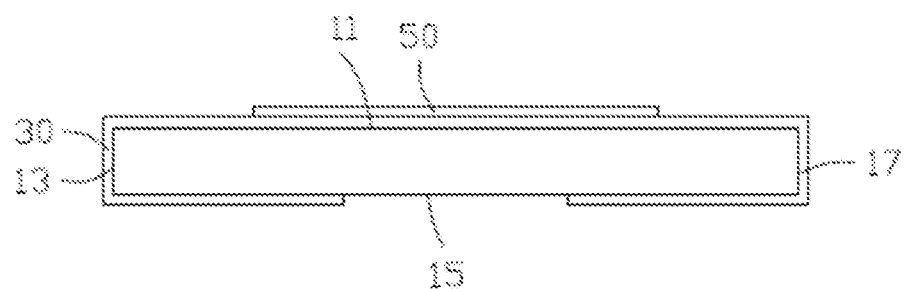

In some embodiments, referring to FIG. 10 and FIG. 11, one end of the first adhesive film 30 may extend from the first lateral surface 13 to the second lateral surface 17 through the first surface 11. In this case, the entire first adhesive layer 50 adheres to a surface of the first adhesive film 30, the surface being located away from the first surface 11. Further, as shown in FIG. 11, the first adhesive film 30 may further extend from the second lateral surface 17 to the second surface 15, and/or the first adhesive film 30 may further extend from the first lateral surface 13 to the second surface 15 in a direction away from the first surface 11.

Figure 12:
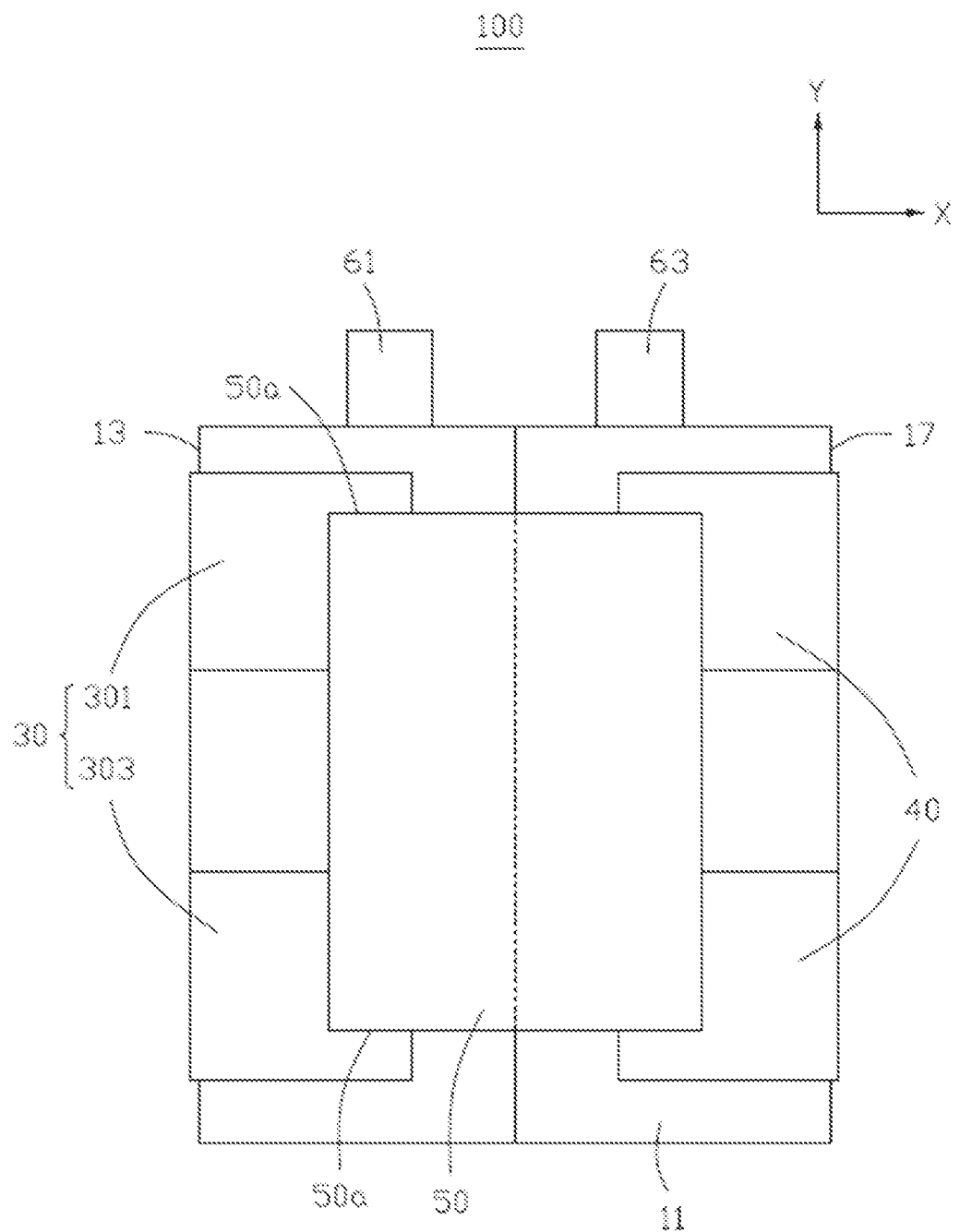
FIG. 12 is a schematic front view of a battery cell according to an embodiment of this application.
Figure 13:
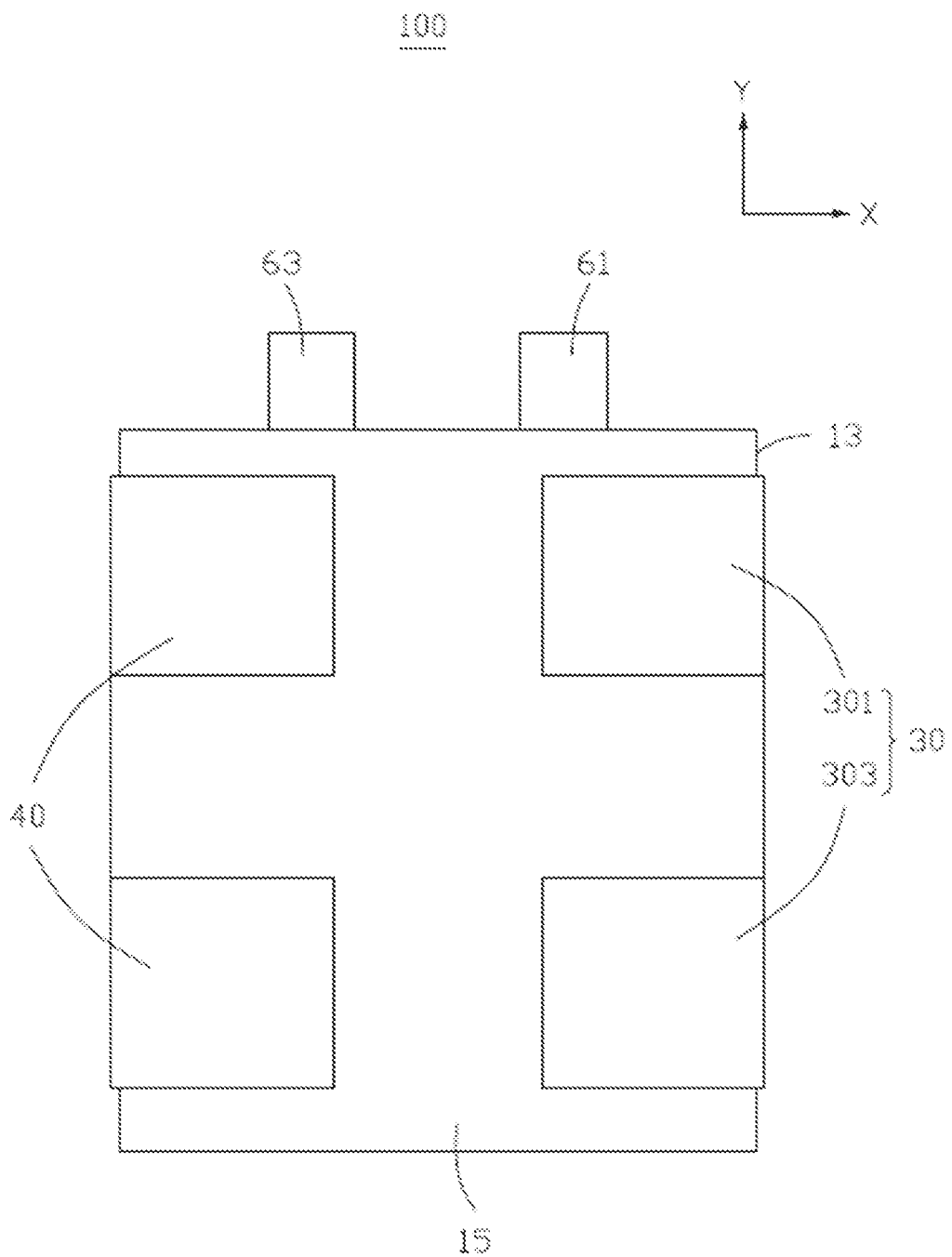
FIG. 13 is a schematic rear view of a battery cell according to an embodiment of this application.

In some embodiments, referring to FIG. 12 and FIG. 13, the first adhesive film 30 includes a first adhesive sub-film 301 and a second adhesive sub-film 303. The first adhesive sub-film 301 and the second adhesive sub-film 303 adhere to the first lateral surface 13 along the second direction Y by being spaced apart, and separately extend from the first lateral surface 13 to the first surface 11. At least a part of the first adhesive layer 50 overlaps the first adhesive sub-film 301 on a surface of the first adhesive sub-film and overlaps the second adhesive sub-film 303 on a surface of the second adhesive sub-film, where the surface of the first adhesive sub-film and the surface of the second adhesive sub-film are located away from the electrode assembly 10. The first adhesive sub-film 301 and the second adhesive sub-film 303 may further extend from the first lateral surface 13 to the second surface 15. In some embodiments, the first adhesive film 30 includes adhesive sub-films not limited to two adhesive sub-films (such as the first adhesive sub-film 301 and the second adhesive sub-film 303). The first adhesive film 30 may include a plurality of adhesive sub-films that adhere to the first lateral surface 13 along the second direction Y by being spaced apart.

Similarly, the second adhesive film 40 includes at least two adhesive sub-films. The at least two adhesive sub-films adhere to the second lateral surface 17 along the second direction Y by being spaced apart. Each adhesive sub-film separately extends from the second lateral surface 17 to the first surface 11 to overlap a part of the first adhesive layer 50. Each adhesive sub-film may further separately extend from the second lateral surface 17 to the second surface 15.

In some embodiments, the first adhesive layer 50 may be disposed on the second surface 15 concurrently.

In some embodiments, the first surface 11 may also be a surface away from a surface in which a tail end of the wound electrode assembly 10 is located.

In some embodiments, the electrode assembly 10 may also be a stacked electrode assembly.

In some embodiments, in some embodiments, a bonding area between the first adhesive layer 50 and the electrode assembly 10 is 51% of an area of an outer surface of the electrode assembly 10.

The battery cell 100 further includes a first tab 61 and a second tab 63. The first tab 61 and the second tab 63 are spaced apart on the electrode assembly 10. In some embodiments, the first adhesive layer 50 is disposed in a region on the first surface 11, where the region corresponds to a region between the first tab 61 and the second tab 63. In some embodiments, the first adhesive layer 50 is disposed on a region of the first surface, where the region is located away from the first tab 61 and the second tab 63.

Figure 14:
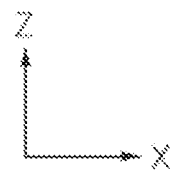
FIG. 14 is a schematic cross-sectional view of a battery cell according to an embodiment of this application.
Figure 14:
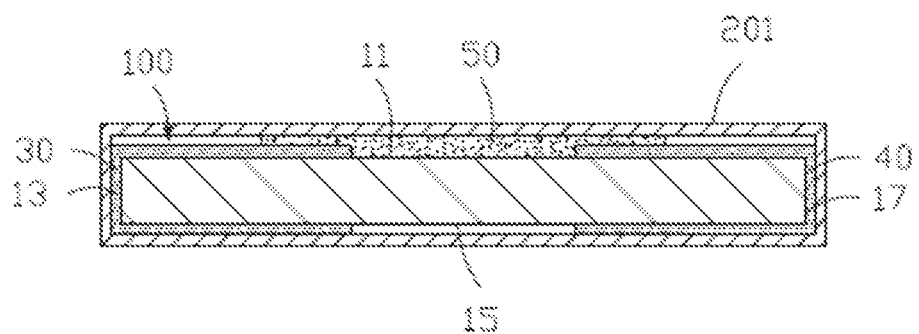

Referring to FIG. 14, the battery cell 100 is applied to a battery 200. The battery 200 further includes a sealing film 201. The sealing film 201 seals the battery cell 100. A surface of the first adhesive layer 50, which is located on a side away from the electrode assembly 10, adheres to the sealing film 201.

The following describes this application in detail with reference to comparative embodiments and embodiments. Understandably, parameters in this application are not limited to the content specified in the comparative embodiments and the embodiments, and may be specifically selected according to actual needs.

Batteries corresponding to Embodiments 1~3 and Comparative Embodiments 1~2 are prepared according to Table 1 below. Parameters and settings are identical between Embodiments 1~3 and Comparative Embodiments 1~2 except the parameters specified in the table. A drop test is performed on the batteries, and corresponding drop test results are recorded in Table 1 below. A negative value of a width of an overlap between the first adhesive layer and the first adhesive film indicates that there is no overlap between the first adhesive layer and the first adhesive film, and represents a spacing between the first adhesive layer and the first adhesive film. A specific method of the drop test is: dropping the battery from a height of 1.2 m to the ground by leaving six surfaces of the battery to land on the ground separately and leaving four corners to land on the ground separately, thereby completing a round of test; and disassembling the battery after every two rounds of drop tests, and checking whether the electrode plate in the electrode assembly is torn; and if the electrode plate is not torn, repeating the drop tests until the electrode plate is torn, where a maximum of 6 rounds are performed. 2 batteries are tested in each group of embodiments or comparative embodiments.

TABLE 1

| Group | Width of the first adhesive layer (mm) | Percentage of the bonding area between the first adhesive layer and the electrode assembly in the area of the outer surface of the electrode assembly | Width of the overlap between the first adhesive film and the first adhesive layer (mm) | Length by which the first adhesive film protrudes from the first end or the second end of the first adhesive layer (mm) | Drop result |
|---|---|---|---|---|---|
| Comparative Embodiment 1 | 30 | 51% | −2 | 5 | The electrode plates of both batteries are torn after 2 rounds |
| Comparative Embodiment 2 | 30 | 51% | 0 | 5 | The electrode plates of both batteries are torn after 2 rounds |
| Embodiment 1 | 30 | 51% | 2 | 5 | The electrode plate of only one battery is torn after 4 rounds |
| Embodiment 2 | 30 | 51% | 5 | 5 | No electrode plate of the batteries is torn after 6 rounds |
| Embodiment 3 | 30 | 51% | 8 | 5 | No electrode plate of the batteries is torn after 6 rounds |

As can be learned from the drop results recorded in Table 1 above, the batteries in Comparative Embodiments 1~2 without any overlap between the first adhesive layer and the first adhesive film failed the drop test. The batteries in Embodiments 1~3 according to this application significantly outperform Comparative Embodiments 1-2 in drop resistance effects. As can be learned from the drop results of Embodiments 1~3, the wider the overlap between the first adhesive film and the first adhesive layer, the higher the drop resistance performance of the electrode assembly in the battery.

In the battery cell 100 and the battery 200 that uses the battery cell 100 according to this application, the first adhesive film 30 overlaps at least a part of the first adhesive layer 50. When the battery cell 100 or battery 200 drops, a part of a force exerted on the first adhesive layer 50 adhering to the sealing film is transferred to the first adhesive film 30, and mutual pulling between the first adhesive layer 50 and the electrode assembly 10 is reduced. In addition, an anti-tearing capability of the first adhesive film 30 is higher than that of the electrode plate in the electrode assembly 10, thereby reducing risks of tearing the electrode plate in the battery cell 100 or battery 200 and improving safety performance of the battery cell or battery.

Various modifications and variations may be made by a person of ordinary skill in the art based on the technical conception hereof, and all such modifications and variations fall within the protection scope of this application.

What is claimed is:

1. A battery cell, comprising:
    an electrode assembly, wherein outer surfaces of the electrode assembly comprise a first surface, a first lateral surface, a second surface, and a second lateral surface that are connected sequentially, the first surface is disposed opposite to the second surface, and the first lateral surface is disposed opposite to the second lateral surface;
    the outer surfaces of the electrode assembly further comprise a top surface, wherein:
        the top surface comprises a tab for connecting to the battery cell, the tab extends out of the electrode assembly from the top surface;
        the top surface is adjacent to the first surface, the first lateral surface, the second surface, and the second lateral surface;
        the first surface comprises a first detachable part and a second detachable part, the second detachable part is located between the first lateral surface and the first detachable part; and
        a tail end of the electrode assembly is located in the first detachable part;
    a first adhesive film, adhering to the first lateral surface and extending from the first lateral surface to the second detachable part of the first surface; and
    a first adhesive layer, adhering to both the first detachable part of the first surface and the second detachable part of the first surface, wherein:
        the first adhesive layer fixes the tail end of the electrode assembly at the first detachable part of the first surface;
        at least a part of the first adhesive layer overlaps the first adhesive film on a side of the first adhesive film in a thickness direction perpendicular to the first surface; and
        in the overlap, the first adhesive film is disposed between the part of the first adhesive layer and the first surface in the thickness direction.

2. The battery cell according to claim 1, wherein, in a first direction perpendicular to the first lateral surface, a width of an overlap between the first adhesive film and the first adhesive layer is greater than or equal to 1 mm.

3. The battery cell according to claim 2, wherein, on the first surface and in a second direction perpendicular to the first direction, the first adhesive layer comprises a first end and a second end opposite to the first end, and the first adhesive film protrudes from the first end and the second end of the first adhesive layer.

4. The battery cell according to claim 3, wherein a length by which the first adhesive film protrudes from the first end or the second end of the first adhesive layer in the second direction is greater than or equal to 1 mm.

5. The battery cell according to claim 1, wherein:
    the battery cell further comprises a second adhesive film;
    the second adhesive film adheres to the second lateral surface, and extends from the second lateral surface to the second detachable part of the first surface;
    a part of the first adhesive layer overlaps the second adhesive film on a side of the second adhesive film in the thickness direction perpendicular to the first surface; and
    in the overlap, the second adhesive film is disposed between the part of the first adhesive layer and the first surface in the thickness direction.

6. The battery cell according to claim 1, wherein one end of the first adhesive film on the first surface extends to the second lateral surface or extends to the second surface through the second lateral surface, and the entire first adhesive layer adheres to a surface of the first adhesive film; and in the overlap, the first adhesive film is disposed between the entire first adhesive layer and the first surface in the thickness direction.

7. The battery cell according to claim 1, wherein the first adhesive film comprises a first adhesive sub-film and a second adhesive sub-film;
    on the first detachable part of the first surface and in a second direction perpendicular to a first direction, the first adhesive sub-film and the second adhesive sub-film adhere to the first lateral surface by being spaced apart, and separately extend from the first lateral surface to the first surface; and
    at least a part of the first adhesive layer overlaps the first adhesive sub-film on a surface of the first adhesive sub-film and overlaps the second adhesive sub-film on a surface of the second adhesive sub-film, wherein in the overlap, the first adhesive sub-film and the second adhesive sub-film are disposed between the part of the first adhesive layer and the first surface in the thickness direction, respectively.

8. The battery cell according to claim 1, wherein the electrode assembly comprises a plurality of electrode plates and a separator located between two adjacent electrode plates, the electrode assembly is formed by winding the electrode plates and the separator, the first surface is a side in which the tail end of an outermost electrode plate in the electrode assembly is located; and the first adhesive layer extends from the first detachable part to the second detachable part to fix the tail end.

9. The battery cell according to claim 1, wherein a side of the first adhesive film away from the electrode assembly is not adhesive, and the first adhesive layer is a hot-melt adhesive.

10. A battery, comprising:
    a sealing film;
    a battery cell, wherein the sealing film seals the battery cell and a first adhesive layer adheres to the sealing film, wherein the battery cell comprises:
        an electrode assembly, wherein outer surfaces of the electrode assembly comprise a first surface, a first lateral surface, a second surface, and a second lateral surface that are connected sequentially, the first surface is disposed opposite to the second surface, and the first lateral surface is disposed opposite to the second lateral surface;
        the outer surfaces of the electrode assembly further comprise a top surface, wherein:

the top surface comprises a tab for connecting to the battery cell, the tab extends out of the electrode assembly from the top surface;

the top surface is adjacent to the first surface, the first lateral surface, the second surface, and the second lateral surface;

the first surface comprises a first detachable part and a second detachable part, the second detachable part is located between the first lateral surface and the first detachable part; and a tail end of the electrode assembly is located in the first detachable part;

a first adhesive film, adhering to the first lateral surface and extending from the first lateral surface to the second detachable part of the first surface; and a first adhesive layer, adhering to both the first detachable part of the first surface and the second detachable part of the first surface, wherein:

the first adhesive layer fixes the tail end of the electrode assembly at the first detachable part of the first surface;

at least a part of the first adhesive layer overlaps the first adhesive film on a side of the first adhesive film in a thickness direction perpendicular to the first surface; and in the overlap, the first adhesive film is disposed between the part of the first adhesive layer and the first surface in the thickness direction.

11. The battery according to claim 10, wherein, in a first direction perpendicular to the first lateral surface, a width of an overlap between the first adhesive film and the first adhesive layer is greater than or equal to 1 mm.

12. The battery according to claim 11, wherein, on the first surface and in a second direction perpendicular to the first direction, the first adhesive layer comprises a first end and a second end opposite to the first end, and the first adhesive film protrudes from the first end and the second end of the first adhesive layer.

13. The battery according to claim 12, wherein a length by which the first adhesive film protrudes from the first end or the second end of the first adhesive layer in the second direction is greater than or equal to 1 mm.

14. The battery according to claim 10, wherein:
the battery cell further comprises a second adhesive film;
the second adhesive film adheres to the second lateral surface, and extends from the second lateral surface to the second detachable part of the first surface;

a part of the first adhesive layer overlaps the second adhesive film on a side of the second adhesive film in the thickness direction perpendicular to the first surface; and in the overlap, the second adhesive film is disposed between the part of the first adhesive layer and the first surface in the thickness direction.

15. The battery according to claim 10, wherein one end of the first adhesive film on the first surface extends to the second lateral surface or extends to the second surface through the second lateral surface, and the entire first adhesive layer adheres to a surface of the first adhesive film; and in the overlap, the first adhesive film is disposed between the entire first adhesive layer and the first surface in the thickness direction.

16. The battery according to claim 10, wherein the first adhesive film comprises a first adhesive sub-film and a second adhesive sub-film;

on the first detachable part of the first surface and in a second direction perpendicular to a first direction, the first adhesive sub-film and the second adhesive sub-film adhere to the first lateral surface by being spaced apart, and separately extend from the first lateral surface to the first surface; and at least a part of the first adhesive layer overlaps the first adhesive sub-film on a surface of the first adhesive sub-film and overlaps the second adhesive sub-film on a surface of the second adhesive sub-film; wherein in the overlap, the first adhesive sub-film and the second adhesive sub-film are disposed between the part of the first adhesive layer and the first surface in the thickness direction, respectively.

17. The battery according to claim 10, wherein the electrode assembly comprises a plurality of electrode plates and a separator located between two adjacent electrode plates, the electrode assembly is formed by winding the electrode plates and the separator, the first surface is a side in which the tail end of an outermost electrode plate in the electrode assembly is located, an ending is located in the first detachable part, and the first adhesive layer extends from the first detachable part to the second detachable part to fix the tail end.

18. The battery according to claim 10, wherein a side of the first adhesive film away from the electrode assembly is not adhesive, and the first adhesive layer is a hot-melt adhesive.

* * * * *